United States Patent [19]
Iino et al.

[11] Patent Number: 5,282,193
[45] Date of Patent: Jan. 25, 1994

[54] MAINTENANCE SIGNAL TRANSMISSION SYSTEM

[75] Inventors: Hatsumi Iino; Takeo Fukushima; Koichi Nishimura, all of Kawasaki, Japan

[73] Assignee: Fujitsu Limited, Kanagawa, Japan

[21] Appl. No.: 795,554

[22] Filed: Nov. 21, 1991

[30] Foreign Application Priority Data

Nov. 24, 1990 [JP] Japan ................... 2-318631
Feb. 8, 1991 [JP] Japan ................... 3-016713

[51] Int. Cl.$^5$ ................... H04J 3/02; H04J 14/08
[52] U.S. Cl. ................... 370/16; 371/8.2; 340/825.01
[58] Field of Search ................... 370/16, 13; 371/8.1, 371/8.2, 11.1, 11.2; 455/8; 340/825.01, 827

[56] References Cited

U.S. PATENT DOCUMENTS

| | | | |
|---|---|---|---|
| 4,967,406 | 10/1990 | Yagi et al. | 370/16 |
| 5,031,176 | 7/1991 | Magne et al. | 371/8.2 |
| 5,115,449 | 5/1992 | Lockyer et al. | 371/8.2 |

FOREIGN PATENT DOCUMENTS

| | | |
|---|---|---|
| 58-202630 | 11/1983 | Japan . |
| 2-52558 | 2/1990 | Japan . |
| 2-52559 | 2/1990 | Japan . |
| 2-230856 | 9/1990 | Japan . |

*Primary Examiner*—Benedict V. Safourek
*Assistant Examiner*—Min Jung
*Attorney, Agent, or Firm*—Nikaido, Marmelstein, Murray & Oram

[57] ABSTRACT

A maintenance signal transmission system incorporates a transmitting station, a receiving station, a main line which connects the transmitting station and the receiving station, and a backup line which connects the transmitting station and the receiving station. The transmitting station at least includes a switch for selectively connecting to one of the main line and the backup line to transmit a main signal and a maintenance signal to the receiving station using the selected line. The receiving station at least includes an adder for adding maintenance signals which are received from both the main line and the backup line. The main and backup lines may or may not take mutually different routes.

10 Claims, 6 Drawing Sheets

MAINTENANCE SIGNAL TRANSMISSION SYSTEM

BACKGROUND OF THE INVENTION

The present invention generally relates to maintenance signal transmission systems, and more particularly to a system for transmitting a maintenance signal by switching a maintenance signal transmission line in a transmission system.

There are transmission systems having a backup line in addition to a main line. In most cases, the main and backup lines coexist in the same optical fiber cable, and this arrangement is sufficient for the purposes of coping with a failure of a communication unit. However, when the optical fiber cable breaks, both the main and backup lines fail and it is impossible to overcome the failure by switching the line from the main line to the backup line. For this reason, there is the so-called route diversity method which provides the main line and the backup line in different routes, that is, different optical fiber cables.

On the other hand, a maintenance signal such as a supervisory/order wire signal is required to make the necessary maintenance of the transmission system. The maintenance signal is inserted into or dropped from a main signal as overhead and is transmitted between stations via a main transmission line. Hence, if the transmission line is switched due to a failure, it is also necessary to switch the transmission line which is used to transfer the maintenance signal. The present invention relates to such a system for switching the maintenance signal transmission line.

FIG. 1 shows an example of a conventional transmission system in which a main line ML and a backup line BL coexist within a single optical fiber cable OFC. This type of optical fiber cable OFC includes 12 optical fibers, for example, and a part is used as the backup lines. For example, one optical fiber is used as a transmitting backup line for transmission and another optical fiber is used as a receiving backup line for reception. In FIG. 1, it is assumed that a terminal 1 is used as the transmitting station and a terminal 2 is used as the receiving station, and that a repeater 3 is provided between the terminals 1 and 2.

FIG. 2 shows a case where a maintenance signal, and particularly a telephone signal OW for maintenance, is transmitted in the transmission system shown in FIG. 1. At the transmitting station, the signal OW is split by a hybrid unit H and is transmitted to both the main line ML and the backup line BL. At the receiving station, the signal OW is received by switching a switch SW to become connected to the main line ML. If the main line ML fails, the signal OW is received by switching the switch SW to become connected to the backup line BL.

When the transmission system has the main and backup lines ML and BL provided within the same optical fiber cable, both the main and backup lines ML and BL fail if the optical fiber cable fails and this failure cannot be cured unless the optical fiber cable is repaired. But when the transmission system employs the route diversity method and the main and backup lines ML and BL are provided within mutually different optical fiber cables, the transmission system becomes as shown in FIG. 3. In other words, the main line ML and the backup line BL both connect the two terminals 1 and 2, but through different routes.

In FIG. 3, the main line ML and the backup line BL both connect the two terminals 1 and 2. However, because the routes taken by the main and backup lines ML and BL are different, the number of repeaters REP in the route, the length of the route and the like are not necessarily the same for the main and backup lines ML and BL.

Suppose that a failure occurs at a point "X" on the main line ML in FIG. 3 and the line being used is switched from the main line ML to the backup line BL. In this case, if the system shown in FIG. 2 is employed, a signal OW1 is transmitted to both the main and backup lines ML and BL from the terminal 1. But since the connection is switched from the main line ML to the backup line BL at the terminal 2, only the signal OW1 transmitted via the backup line BL is received by the terminal 2. The transmission of the maintenance signal between the terminals 1 and 2 is ensured by this system, however, the signal OW at a repeater $REP_1$ of the main line ML causes a problem.

In other words, even if a failure occurs in a line, a transmission path for the maintenance signal between a repeater of this line and a terminal which is connected to this line must be maintained. In FIG. 3, the transmission path between the repeater $REP_1$ and the terminal 2 is normal even though the failure exists at the point "X", and the transmission of the maintenance signal between the repeater $REP_1$ and the terminal 2 must be maintained. However, since the switching is made at the terminal 2 to switch the connection from the main line ML to the backup line BL in response to the generation of the failure at the point "X", no transmission of the maintenance signal is possible between the repeater $REP_1$ and the terminal 2.

In order to overcome the above described problem, it is conceivable to add the signals received from the main and backup lines ML and BL by an adder ADD as shown in FIG. 4 instead of switching the connection as shown in FIG. 2. According to this conceivable system, the maintenance signal can be transmitted between the repeater $REP_1$ and the terminal 2 even if a failure occurs on the main line ML, as long as the transmission path between the repeater $REP_1$ and the terminal 2 is normal. However, a problem occurs when transmitting the maintenance signal between the terminals 1 and 2 when no failure exists. In other words, the routes taken by the main and backup lines ML and BL are mutually different when the route diversity method is employed, and the transmission delay via the main and backup lines ML and BL inevitably differ even if the signal is simultaneously split at the transmitting station. As a result, when no failure exists on the main and backup lines ML and BL, signals which are the same but have mutually different phases are added in the adder ADD at the receiving station, thereby generating beat or cancelling of voice. Therefore, it becomes impossible to make a normal communication.

Accordingly, when the main and backup lines are provided and the route diversity method is employed, a problem occurs when a failure occurs on the main line and the line being used is switched from the main line to the backup line at the receiving station. The problem is that, since the receiving station is switched and connected to the backup line, no communication can be made between a repeater on the main line and the receiving station even if the transmission path between this repeater and the receiving station is normal. In other words, since the transmission path between the repeater and the receiving station is normal, a signal such as the alarm indication signal (AIS) is transmitted to this transmission path, but the receiving station cannot receive this signal.

On the other hand, if the signals received via the main and backup lines are added at the receiving station in order to overcome the above described problem, a normal communication cannot be made when no failure exists on the main and backup lines because of the inevitable difference between the transmission delays of the signals transmitted via the main and backup lines.

SUMMARY OF THE INVENTION

Accordingly, it is a general object of the present invention to provide a novel and useful maintenance signal transmission system in which the problems described above are eliminated.

Another and more specific object of the present invention is to provide a maintenance signal transmission system comprising a transmitting station, a receiving station, a main line which connects the transmitting station and the receiving station, and a backup line which connects the transmitting station and the receiving station, where the transmitting station at least includes switching means for selectively connecting to one of the main line and the backup line to transmit a main signal and a maintenance signal to the receiving station using the selected line, and the receiving station at least includes adder means for adding maintenance signals which are received from both the main line and the backup line. According to the maintenance signal transmission system of the present invention, the receiving station can always receive the maintenance signal which is transmitted from the transmitting station in a correct state free of phase error and the like which would occur if the same signal were received via both the main and backup lines. In addition, the receiving station can always receive the maintenance signals which are transmitted from repeaters which are provided in both the main and backup lines. Furthermore, the present invention may be applied to the case where the main and backup lines take the same route as well as to the case where the main and backup lines take mutually different routes.

Other objects and further features of the present invention will be apparent from the following detailed description when read in conjunction with the accompanying drawings.

DESCRIPTION OF THE PREFERRED EMBODIMENTS

Figure 1:
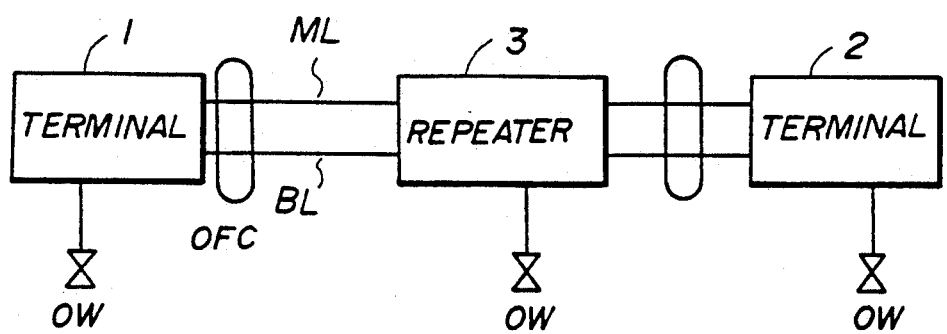
FIG. 1 is a system block diagram showing an example of a conventional transmission system in which a main line and a backup line coexist within a single optical fiber cable.
Figure 2:
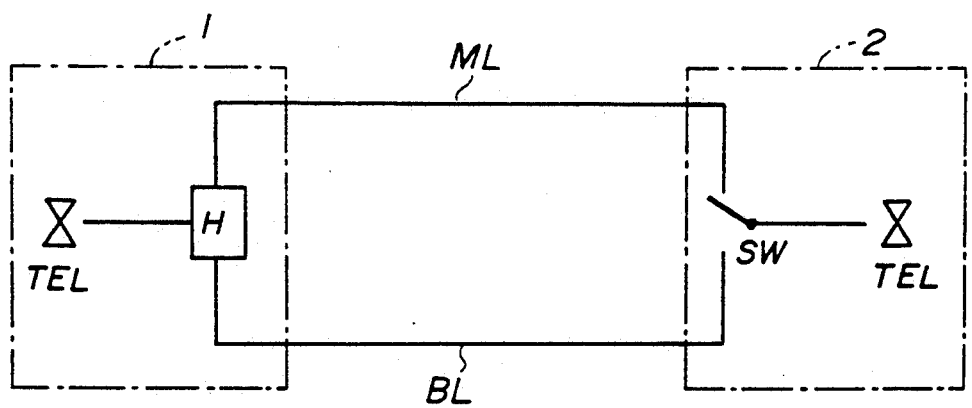
FIG. 2 is a system block diagram showing a case where a maintenance signal is transmitted in the transmission system shown in FIG. 1.
Figure 3:
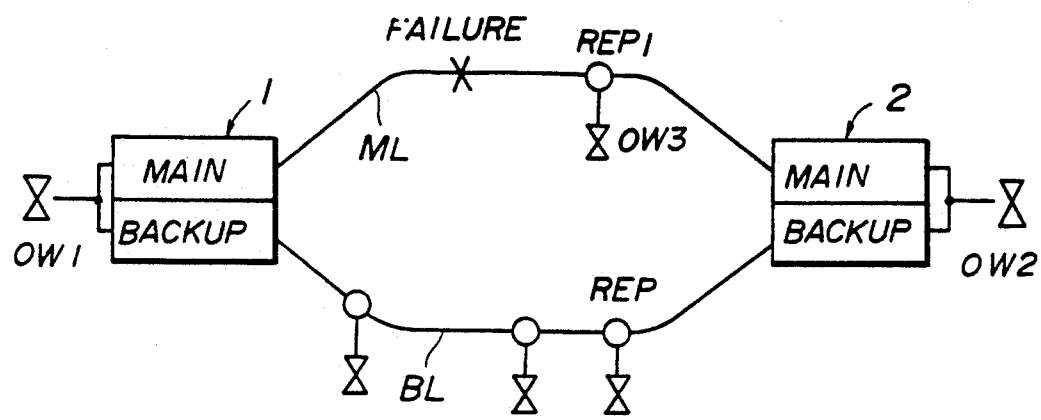
FIG. 3 is a system block diagram showing a case where the transmission system employs the route diversity method and the main and backup lines are provided within mutually different optical fiber cables.
Figure 4:
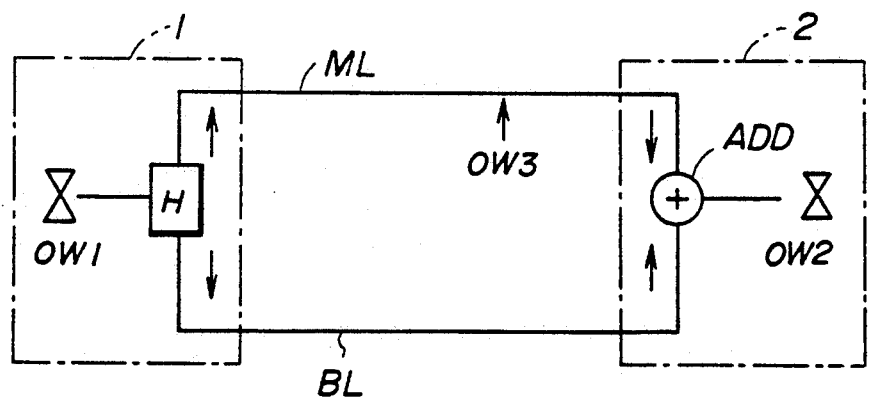
FIG. 4 is a system block diagram showing a conceivable transmission system in which signals received from the main and backup lines are added at the receiving station.
Figure 5:
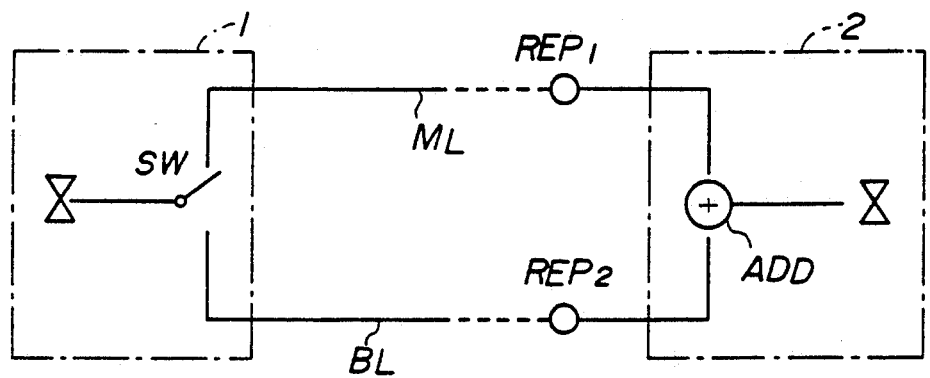
FIG. 5 is a system block diagram for explaining the operating principle of the present invention.

First, a description will be given of the operating principle of the present invention, by referring to FIG. 5. In FIG. 5, those parts which are basically the same as those corresponding parts in FIGS. 1 through 4 are designated by the same reference numerals, and a description thereof will be omitted.

As shown in FIG. 5, the present invention switches the connection between the main line ML and the backup line BL at the terminal 1, that is, at the transmitting station. On the other hand, the signals received via the main and backup lines ML and BL are added in the adder ADD at the terminal 2, that is, at the receiving station When the main line ML is in use, the switch SW is connected to the main line ML, and the transmission of the maintenance signal between the terminals 1 and 2 is made via a path which includes the switch SW of the terminal 1, the main line ML, the repeater $REP_1$ and the adder ADD of the terminal 2. In this case, the repeater $REP_2$ of the backup line BL can communicate with the terminal 2, and a normal conversation is possible even when the maintenance signals are simultaneously received at the terminal 2 via the main and backup lines ML and BL. Since the maintenance signals received via the main and backup lines ML and BL in this case are not identical, the two maintenance signals are simply added and heard on the receiving end but the generation of beat is prevented.

On the other hand, when the switch SW is switched and connected to the backup line BL at the terminal 1, the maintenance signal can be transmitted between the terminals 1 and 2 via a path which includes the switch SW, the backup line BL, the repeater $REP_2$ and the adder ADD. In this case, the repeater $REP_1$ of the main line ML can communicate with the terminal 2, and a normal conversation is possible even when the maintenance signals are simultaneously received at the terminal 2 via the main and backup lines ML and BL. Since the maintenance signals received via the main and backup lines ML and BL in this case are not identical, the two maintenance signals are simply added and heard on the receiving end but the generation of beat is prevented.

Therefore, the maintenance signal which is transmitted from the terminal 1 is transmitted to the terminal 2 via only one of the main and backup lines ML and BL. But the terminal 2 always receives the maintenance signals which are received via both the main and backup lines ML and BL, such as the maintenance signal from the terminal 1 received via the main line ML and the maintenance signal from the repeater $REP_2$ received via the backup line BL.

The main and backup lines ML and BL are optical fibers, for example, and the main and backup lines ML and BL may take mutually different routes, that is, provided within mutually different optical fiber cables, for example.

The present invention merely requires the switch SW at the transmitting station and the adder ADD at the receiving station, and the transmission system can be realized by making a simple modification to the conventional transmission system.

Next, a description will be given of an embodiment of a maintenance signal transmission system according to the present invention, by referring to FIG. 6.

Figure 6:
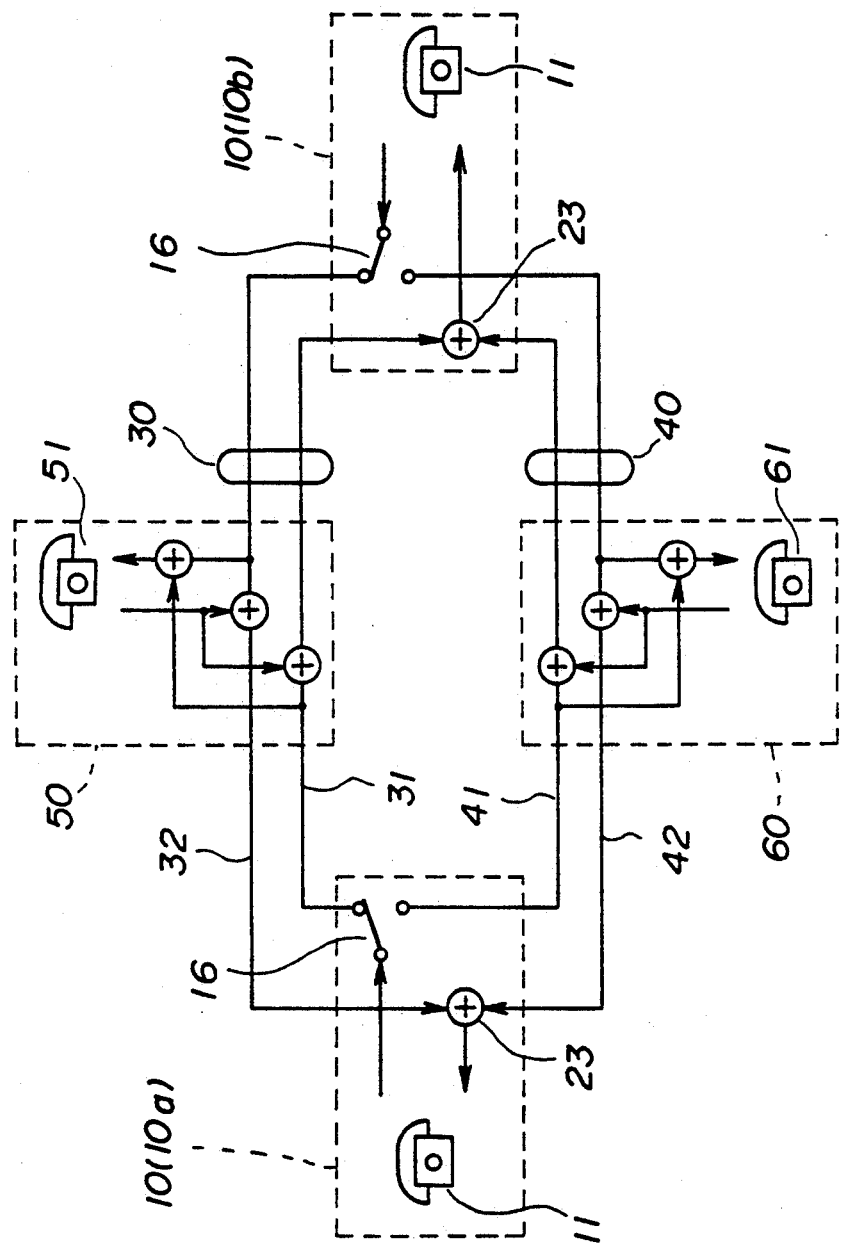
FIG. 6 is a system block diagram showing an embodiment of a maintenance signal transmission system according to the present invention.

In FIG. 6, terminals 10a and 10b are connected by a main line 30 and a backup line 40. In this embodiment, the main and backup lines 30 and 40 are optical fiber cables which take different routes. A pair of optical fibers 31 and 32 for transmitting an optical signal both upstream and downstream are provided within the main line 30. On the other hand, a pair of optical fibers 41 and 42 for transmitting an optical signal both upstream and downstream are provided within the backup line 40. The terminals 10a and 10b respectively include a telephone set 11, a switch 16 and an adder 23.

A repeater 50 is provided at an intermediate part of the main line 30, while a repeater 60 is provided at an intermediate part of the backup line 40. An order wire signal for maintenance is inserted and dropped with respect to each of the main and backup lines 30 and 40 at the respective repeaters 50 and 60. Telephone sets 51 and 61 are respectively provided at the repeaters 50 and 60 and used for maintenance purposes.

Normally, the main signal from the repeater 50 or 60 is inserted into a pseudo signal on the corresponding line 30 and 40. When a failure occurs in the main line 30 between the terminal 10a and the repeater 50, the signal from the repeater 50 is inserted into the alarm indication signal (AIS) or the like which is transmitted to the terminal 10b via the normal part of the main line 30. In other words, the main signal transmits the AIS, and the maintenance signal exists in the overhead bits of the main signal.

In the state where the switches 23 of the terminals 10a and 10b are connected as shown in FIG. 6, the telephone set 11 of the terminal 10b receives a signal which is obtained by adding the signal from the repeater 60 to the sum of the signals received from the terminal 10a and the repeater 50. In addition, the telephone set 11 of the terminal 10a receives a signal which is obtained by adding the signal from the repeater 60 to the sum of the signals received from the terminal 10b and the repeater 50.

If a failure occurs on the main line 30 between the terminal 10a and the repeater 50, the switches 16 switch over and connect to the backup line 40. As a result, the telephone set 11 of the terminal 10b receives a signal which is obtained by adding the signal from the repeater 50 to the sum of the signals received from the terminal 10a and the repeater 60. Further, the telephone set 11 of the terminal 10a receives a signal which is the sum of the signals received from the terminal 10b and the repeater 60.

Therefore, the maintenance signal transmitted from the repeaters 50 and 60 are always received by the terminal 10b (that is, the receiving station) regardless of the connection of the switch 16 of the terminal 10a (that is, the transmitting station).

Figure 7:
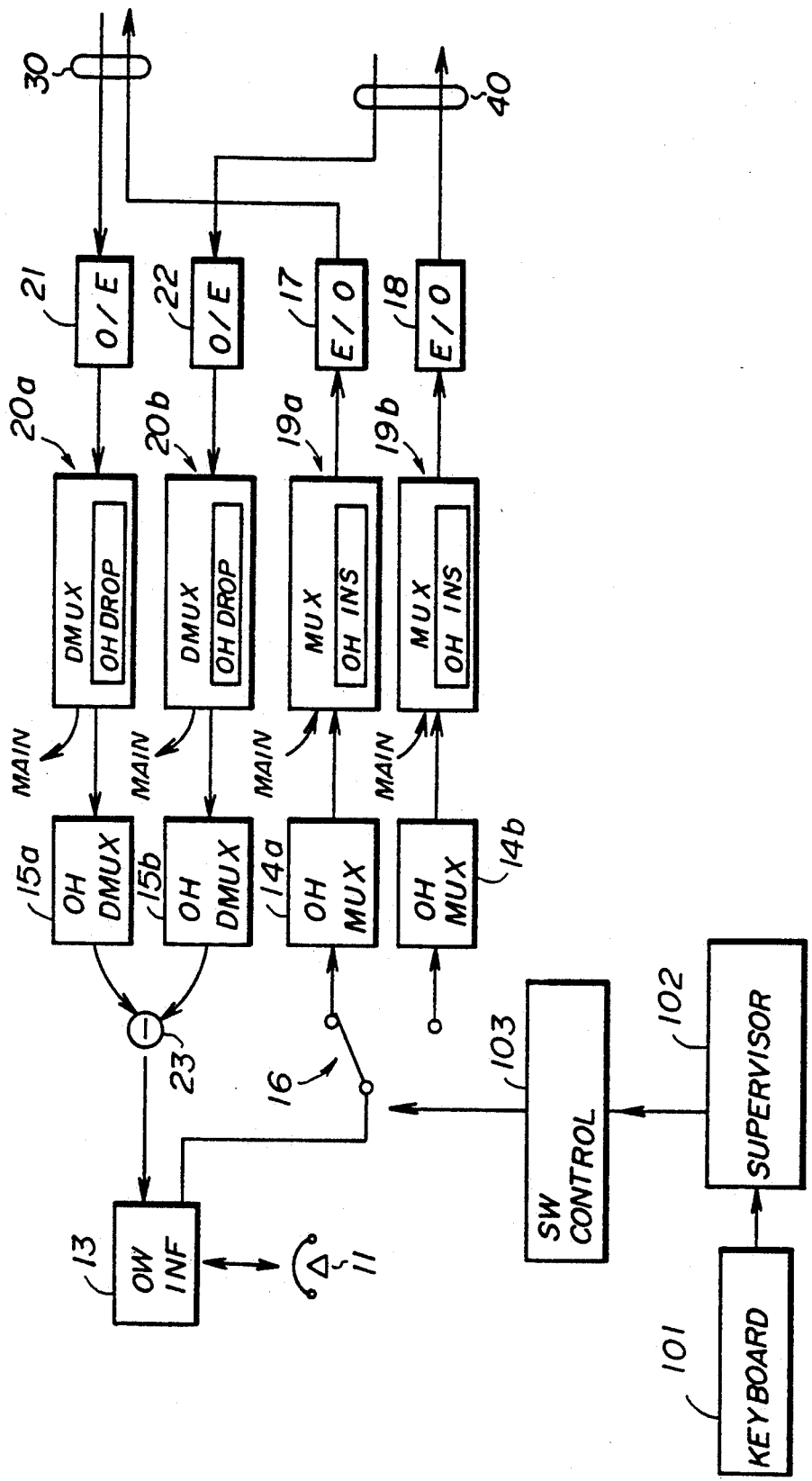
FIG. 7 is a system block diagram showing an essential part of the embodiment shown in FIG. 6.

FIG. 7 shows an embodiment of a terminal 10. This terminal 10 may be used as the terminals 10a and 10b shown in FIG. 6.

The terminal 10 shown in FIG. 7 has the telephone set 11, an order wire interface 13, the switch 16, overhead multiplexers 14a and 14b, multiplexers 19a and 19b, optoelectric converters 17 and 18, electrooptic converters 21 and 22, demultiplexers 20a and 20b, overhead demultiplexers 15a and 15b, and the adder 23 which are connected as shown.

The switch 16 is normally connected to the overhead multiplexer 14a so that the transmission is made using the main line 30. In this case, the order wire signal for maintenance is transmitted from the telephone set 11 and is supplied to the overhead multiplexer 14a via the order wire interface 13 and the switch 16. The overhead multiplexer 14a multiplexes the order wire signal with other maintenance signals or the like and supplies multiplexed overhead bits to the multiplexer 19a. The multiplexer 19a multiplexes the multiplexed overhead bits to a main signal, and supplies a multiplexed signal to the electrooptic converter 17. The electrooptic converter 17 converts the multiplexed signal into an optical signal, and this optical signal is transmitted to the optical fiber of the main line 30.

If a failure occurs on the main line 30, the switch 16 is automatically switched over and connected to the overhead multiplexer 14b. Hence, in this case, the order wire signal is transmitted to the optical fiber of the backup line 40 via the multiplexer 19b and the electrooptic converter 18.

The overhead multiplexers 14a and 14b also have the function of converting the incoming analog signal into a digital signal.

On the other hand, the optical signal which is received from the optical fiber of the main line 30 is supplied to the optoelectric converter 21 which converts the optical signal into an electrical multiplexed signal. The demultiplexer 20a demultiplexes the multiplexed signal into the main signal and the multiplexed overhead bits, and the overhead demultiplexer 15a demultiplexes the multiplexed overhead bits into the overhead bits and the order wire signal. The order wire signal is supplied to the telephone set 11 via the adder 23 and the order wire interface 13.

Similarly, the optical signal which is received from the optical fiber of the backup line 40 is supplied to the optoelectric converter 22 which converts the optical signal into an electrical multiplexed signal. The demultiplexer 20b demultiplexes the multiplexed signal into the main signal and the multiplexed overhead bits, and the overhead demultiplexer 15b demultiplexes the multiplexed overhead bits into the overhead bits and the order wire signal. The order wire signal is supplied to the telephone set 11 via the adder 23 and the order wire interface 13.

The overhead demultiplexers 15a and 15b also have the function of converting the incoming digital signal into an analog signal.

In FIG. 7, a supervisor 102 supervises the entire transmission system shown in FIG. 6. Normally, the failure generated at the transmitting end is detected at the receiving end but not detectable at the transmitting end. When the failure is generated between the terminal 10a and the repeater 50, this failure is detected at the terminal 10b which receives a remote alarm, for example. Hence, the supervisor 102 can monitor the address (telephone number) of the signal OW received from the terminal 10b and control a switching controller 103 so as to switch over and connect the switch 16 of the terminal 10a to the overhead multiplexer 14b.

Of course, it is also possible to control the switch 16 manually from a keyboard 101 via the supervisor 102 and the switching controller 103.

Figure 8:
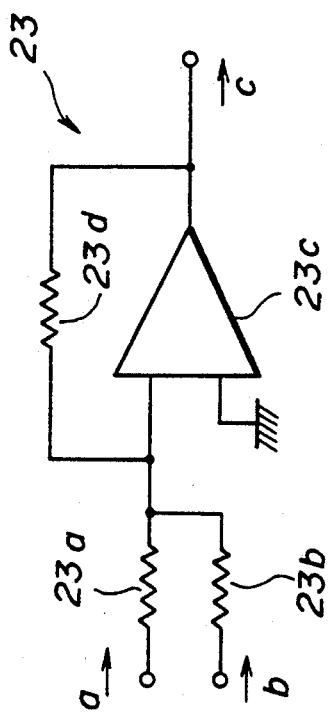
FIG. 8 is a system block diagram showing another essential part of the embodiment shown in FIG. 6.

FIG. 8 shows an embodiment of the adder 23. The analog adder 23 shown in FIG. 8 includes resistors 23a, 23b and 23d, and an operational amplifier 23c which are connected as shown. The resistor 23a receives a signal a from the overhead demultiplexer 15a shown in FIG. 7, and the resistor 23b receives a signal b from the overhead demultiplexer 15b. The signals a and b are supplied to the same input terminal of the operational amplifier 23c, and this input terminal of the operational amplifier 23c also receives an output signal c of the operational amplifier 23c. The other input terminal of the operational amplifier 23c is grounded. Hence, the output signal c of the operational amplifier 23c which is supplied to the order wire interface 13 shown in FIG. 7 is a sum of the input signals a and b received from the overhead demultiplexers 15a and 15b.

The maintenance signal is of course not limited to the order wire signal, and other maintenance signals may be used. For example, it is also possible to use as the maintenance signal a supervisor signal which is used when communicating with the supervisor 102. Moreover, the present invention is not limited to the route diversity type transmission paths, and is also applicable to the case where main and backup lines are provided within the same cable.

In the described embodiment, the present invention is applied to the transmission system having optical transmission paths, but the transmission paths are not limited to the optical transmission paths.

Further, the present invention is not limited to these embodiments, but various variations and modifications may be made without departing from the scope of the present invention.

What is claimed is:

1. A maintenance signal transmission system comprising:
    a transmitting station;
    a receiving station;
    a main line so as which connects said transmitting station and said receiving station; and
    a backup line which connects said transmitting station and said receiving station,
    said transmitting station at least including switching means for selectively connecting to one of said main line and said backup line to transmit a main signal and a maintenance signal to said receiving station using the selected line,
    said receiving station at least including adder means for adding maintenance signals which are received from both said main line and said backup line.

2. The maintenance signal transmission system as claimed in claim 1, wherein said main line and said backup line are made of optical fibers.

3. The maintenance signal transmission system as claimed in claim 1, wherein said main line and said backup line are provided in a single cable.

4. The maintenance signal transmission system as claimed in claim 1, wherein said main line and said backup line take mutually different routes within mutually different cables.

5. The maintenance signal transmission system as claimed in claim 1, wherein said switching means is normally connected to said main line and automatically switches over to connect to said backup line when a failure occurs on said main line.

6. The maintenance signal transmission system as claimed in claim 5, wherein said switching means includes means for automatically switching over to connect to said backup line in response to a notification received from said receiving station, said notification notifying a failure on said main line.

7. The maintenance signal transmission system as claimed in claim 1, wherein said receiving station receives the maintenance signal transmitted from said transmitting station via only one of said main line and said backup line.

8. The maintenance signal transmission system as claimed in claim 1, which further comprises at least a first repeater provided in said main line between said transmitting and receiving stations and at least a second repeater provided in said backup line between said transmitting and receiving stations, and said receiving station receives maintenance signals transmitted from both said first and second repeaters via said main and backup lines and said adder means regardless of whether said switching means is connected to said main line or said backup line.

9. The maintenance signal transmission system as claimed in claim 1, wherein said transmitting station includes a telephone set which is coupled to said switching means and supplies the maintenance signal to said switching means, and said receiving station includes a telephone set which is coupled to said adder means and receives the maintenance signals from said main and backup lines via said adder means.

10. The maintenance signal transmission system as claimed in claim 1, wherein said transmitting station includes with respect to each of said main and backup lines an overhead multiplexer for multiplexing a maintenance signal with other maintenance signals to output overhead bits and a multiplexer for multiplexing the overhead bits output from the overhead multiplexer and the main signal to output a multiplexed signal to a corresponding one of the main and backup lines, and said receiving station includes with respect to each of said main and backup lines a demultiplexer for demultiplexing the multiplexed signal received from a corresponding one of the main and backup lines into the main signal and the overhead bits and an overhead demultiplexer for demultiplexing the overhead bits into the maintenance signal which is supplied to said adder means.

* * * * *